United States Patent [19]
Gautier et al.

[11] 4,112,459
[45] Sep. 5, 1978

[54] TELEVISION PICTURE PHOTOGRAPHIC FILM RECORDING SYSTEM

[75] Inventors: Christian Jean Gautier, Acigne; Bernard Marti, Noyal, Vilaine; Michel Robert Mauduit, Pace; André Jean-Francois Louineau, Janze; Christiane Schwartz nee Luneau, Cesson-Sevigne, all of France

[73] Assignee: Etablissement Public dit "Telediffusion de France", Montrouge, France

[21] Appl. No.: 725,727

[22] Filed: Sep. 23, 1976

[30] Foreign Application Priority Data

Oct. 6, 1975 [FR] France ............................ 75 31014

[51] Int. Cl.² .......................................... H04N 5/84
[52] U.S. Cl. .................................................. 358/6
[58] Field of Search ............................. 358/6, 130; 179/100.3 R, 100.3 Z

[56] References Cited
U.S. PATENT DOCUMENTS 3,617,626 11/1971 Bluth et al. ...................... 358/6 X
3,943,559 3/1976 D'Auria et al. ...................... 358/6

Primary Examiner—Richard Murray
Attorney, Agent, or Firm—Charles A. Laff; J. Warren Whitesel; Howard B. Rockman

[57] ABSTRACT

A television video signal is used to record a television picture onto a photographic film.

The television video signal is sampled, then digitized. Luminance data and chrominance data, if any, for each sample are stored in a memory. Then, such data is read out and selectively applied to an electro-optic device, such as one, for instance, made of electro-luminescent diodes. The diodes generate either monochrome or trichrome luminous points which are recorded on film by means of a photographic camera. Means are provided for eliminating frame interlacing and for using substantially a standard camera.

The system may be used with any television standard.

12 Claims, 14 Drawing Figures

Monochrome TV Picture Recording System

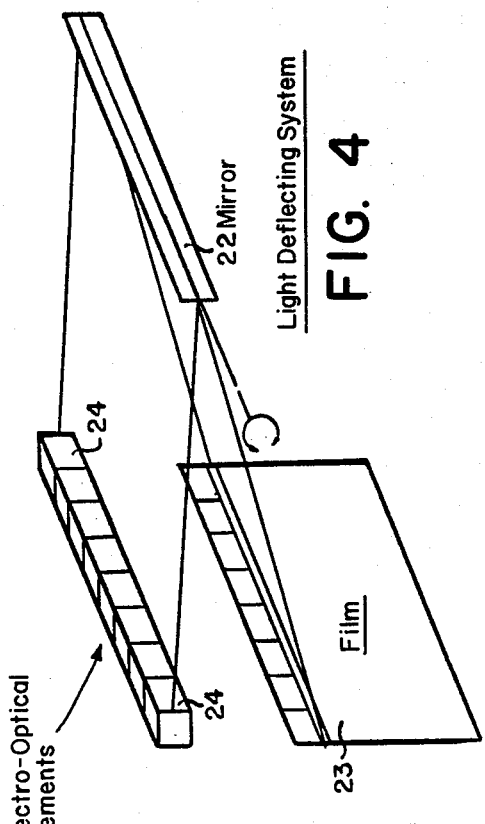
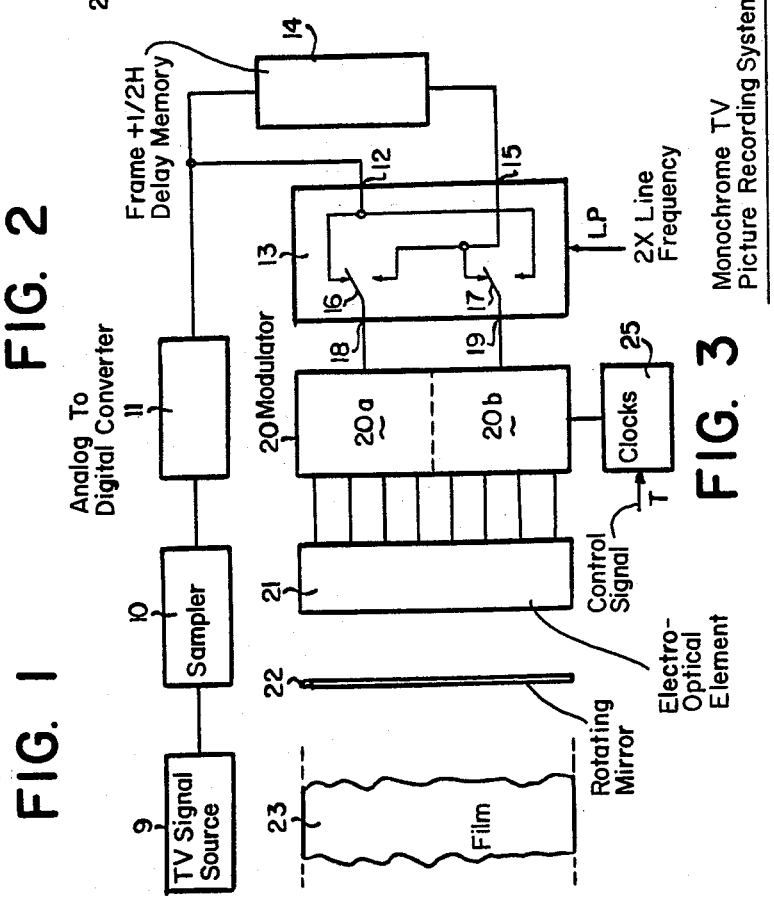

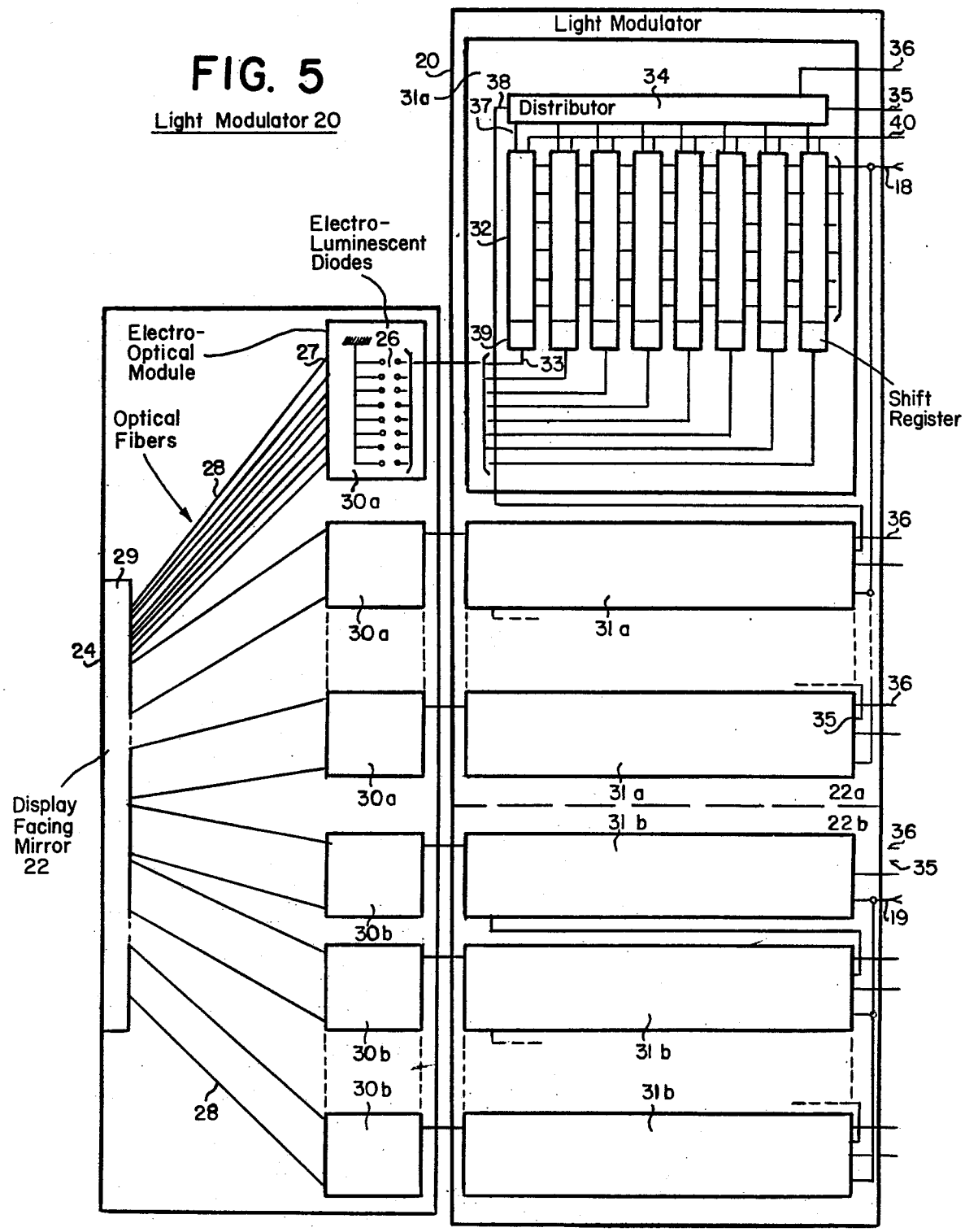

Trichrome TV Picture Recording System

Trichrome
Electro-Optic
Device 75

Light Collector For Use
With Trichrome Device

TELEVISION PICTURE PHOTOGRAPHIC FILM RECORDING SYSTEM

The present invention relates to a television picture photographic film recording system. It is already known to record television pictures on magnetic recording means. However, since monochrome and color television signal standards change from one country to another, it is difficult to merely utilize magnetic tape records originating in one country on a recorder, in a different country where those records have to be broadcast. Conversely, either 35-millimeter films or 16-millimeter films are standardized on a world-wide basis and constitute the ideal support for international television picture trades. Unfortunately, presently known systems and apparatuses used for film recording television pictures have certain drawbacks.

Thus, shadow mask tube kinescopes convey aberrations to the film. In particular, luminophor grain structure does not permit a correct color synthesis when the picture to be recorded is sharp. An attempt to make the image less sharp leads to a reduction of the total picture definition. In addition, the periodic picture structure has the telecine analysis in "moire" or strobing effect. Since the tube screen is not perfectly flat there are small level differences from the picture center to edges. Tube scanning systems result in geometry deteriorations. Difficulties in adjusting tube beam convergences result in calibration defects. As a conclusion, shadow mask tube kinescopes are relatively simple and cheap, but they provide poor records.

A laser kinescope makes it possible, by using lasers, to select the best fitted wave lengths to the photographic emulsions and to obtain a good calibration of the beams which are superimposed, before deflecting them. But there is still the need to provide a fully mechanical scanning. For the horizontal deflection, such a scanner uses a beryllium faceted spinning top revolving at about 30,000 rpm and thus there is a risk that it might explode. Finally a laser kinescope is heavy, costly, difficult to be exploited and presently does still not provide a satisfactory picture.

The three-tube kinescope causes the shadow mask tube grain structure to disappear, but it does not make easier contrast settings. In this case, the three gamma laws are independent which was not entirely the case in the shadow mask tube kinescope, and does not facilitate calibration settings. Those defects may be overcome by using a false three-tube which is a monochrome kinescope utilized three times in succession with fitted color filters. However, it does not make it possible to record the film on a real-time basis and an intermediate recording is required, such as a magnetic tape.

The French patent application No. 2,042,706 (corresponding to the U.S. patent application Ser. No. 825,291 first-filed on May 16, 1969) describes an electronic system for processing polychrome pictures in order to produce high definition color films. Such an electronic system comprises a television camera for providing signals to analog/digital converters which delivers digital signals to digital stores. Signals from digital stores are provided to digital/analog converters which supply laser beam color recorders wherein every line is scanned as in a conventional camera.

A purpose of the present invention is to provide a television picture photographic film recording system which has not the drawbacks of the known systems and apparatus.

Another purpose of the present invention is to provide a television picture photographic film recording system wherein the television video signal is sampled. The number of samples define the photographic film resolution. Every sample consists of digital luminance data and digital chrominance data, if any, corresponding to a point in the television picture. Those digital luminance and chrominance data are stored in an appropriate digital store. The recording onto the film from the digital store does not require line scanning or involve expensive mechanical means.

According to this invention, there is provided such a system wherein every sample is read from the digital store in the form of a digital signal that is selectively applied to a set of electrodes of a steady electro-optic device. The set of electrodes produce on the electro-optic device surface, which is filmed by means of a photographic film camera, either a monochrome or a polychrome light point having a luminous intensity and color, if any, which vary as a function of the sample contents.

According to another feature of this invention, the filmed electro-optic device surface corresponds either to a picture line or a picture line portion. The line samples or line portion samples being simultaneously applied to the set of electro-optic device electrodes. Vertical scanning means enables the cinema camera to sequentially film the picture lines.

According to another feature, the vertical scanning means consist of a mirror rotating at a rate which depends on the vertical scanning frequency. The mirror reflects toward the cinema camera, the impinging light generated by the filmed electro-optic device surface.

According to another feature, the vertical scanning means are a mirror swinging about a horizontal axis, the swing frequency being the vertical scanning frequency the swing wave form being a symmetric saw-tooth.

According to another feature, vertical scanning means are vertical photographic film moving means within the cinema camera.

According to another feature, when the actual television picture scanning comprises two interlaced frame scannings, the samples belonging to one of the two interlaced frames are directly applied from the digital store to the set of electro-optic device electrodes while the samples belonging to the other frame are delayed by a time interval equal to a frame period plus a half-line period before being applied to the said set of electro-optic device electrodes. The filmed electro-optic device surface is operative during a time period which is equal or shorter than a half-line period so as to obtain a full picture wherein interlacement is suppressed.

According to another feature, the electro-optic device operates only during every second frame by displaying a full picture during a frame and nothing during the next frame, so as to have a conventional cinema recording cycle.

According to another feature, the vertical scanning means are conventional cine camera film moving means. However, the film is moved during the recording of a picture and is stopped between picture recordings. That is reversed to the normal operation of a conventional cinema camera. The cinema camera shutter is open while the film moves, but closed when it is stopped.

Another purpose of the present invention is to improve the operation process from digital data read-out in the digital stores and electro-optic device lighting by eliminating the conventional digital/analog conversion. In the French Pat. No. 2,095,389, there is described a system for displaying digital data wherein the digital samples read out from a memory are in the form of digital words of bits having their respective weights. Each bit is applied to an electrode of the electro-optic device for a time period which is depending on its weight. The light intensity generated by the electro-optic component is constant regardless of the weight of the applied bit when the value thereof is "1," but is null when the applied bit value is "0."

According to another feature of this invention, there is provided an electro-optic display system, possibly for making photographic recordings. The system comprises a binary modulation means for modulating the electro-optic transducers for displaying digital signals. Each digital word corresponds to a display screen point made of bits having different weights. The modulation period generated by each bit depends on its weight. The binary modulation means comprises as many shift registers as there are points to be simultaneously displayed. Each shift register has as many cells as there are bits in a digital word, plus an output cell. These shift registers are read out by means of shift signals provided by a clock for delivering pulses which are separated by time intervals depending on the weight of the bit to be shifted into said output cell. Output signal from the output cell are either directly or not applied for operating the electro-optic transducer of the point associated with the involved digital word.

According to another feature, the electro-optic device is made, in the case of monochrome picture recordings, of three sets of components in electro-optic material. Each component is controlled by a pair of electrodes, one electrode being grounded and the other one being connected to the corresponding sample memory output. Each point of the electro-optic device surface which is to be filmed is associated with three components, each belonging to a different set and each radiating one out of the three primary colors. The three components associated with a point are close enough to each other so as to substantially radiate in the same direction toward optical means mixing the primary lights radiated from the components and guiding the mixed light to the surface to be filmed.

According to another feature, each component is an electroluminescent diode. The optical means comprises a light collector and an optical guide. The light collector is constituted by the hollow part of a frusto-conic surface. The electroluminescent diode is arranged in the center of the base thereof, in the case of monochrome recording; or, the three electroluminescent diodes are arranged close to the center of the base thereof, in the case of polychrome recording. The input cross-section of an optical guide is arranged in the top thereof.

According to another feature, the optical guide is an optical fiber.

From the above, the system, according to this invention, contrary to prior picture recording systems, utilizes no point-by-point photographic film scanning. In prior systems, such a scanning was implemented either by the deflection of an electronic spot on a fluorescent screen or by the mechanical deviation of a narrow coherent light beam. On the contrary, in the recording system according to this invention, no movement of an elementary point is involved. The individual points of the picture or a significant portion of the picture are individually embodied in the form of an area determined on an appropriate electro-optic material by means of a set of electrodes. Energy radiated by each point may thus be separately controlled, and the characteristics of that point may be determined independently of those of adjacent points. Therefore, the system has a greater flexibility in use and in particular allows, the possibility to select a method for modulating the electro-optic material which easily suppresses non-linearity effects due to the electro-optic materials.

The above mentioned features of the present invention, as well as others, will appear more clearly from the following description of embodiments, the description being made in conjunction with the accompanying drawings, wherein:

FIG. 1 schematically illustrates a television picture with two interlaced frames;

FIG. 2 schematically shows an amplitude-versus-time curve for a monochrome picture line signal;

FIG. 3 is a block-diagram of a monochrome television picture photographic film recording system according to this invention;

FIG. 4 is a schematic view illustrating an embodiment wherein light is radiated from the front side of the electro-optic device incorporated in the system shown in FIG. 3 and is deflected toward the recording film;

FIG. 5 is the block-diagram of a light modulator associated with an electro-optic device of the system shown in FIG. 3;

FIG. 14 is the block-diagram of a colorimetric corrector utilized in the system shown in FIG. 11.

Figure 7:
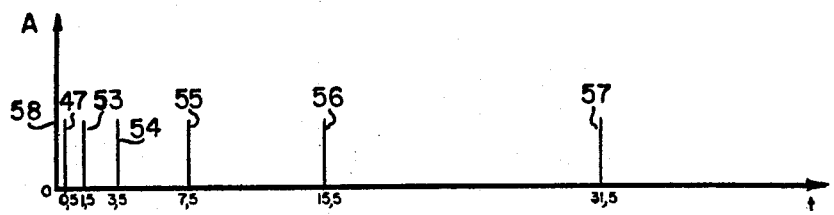
FIG. 7 illustrates the time positions of clock pulses delivered from a clock among those shown in FIG. 6.

In the conventional view of FIG. 1, one frame may be seen as constituted by odd lines and the other frame by even lines, which are crosshatched in opposite directions. The two interlaced frames together form a complete picture. It is only reminded that the total number of lines within the two frames, including field-blanking interval lines, is an odd number. The number of lines within a frame, including the corresponding field-blanking interval lines, is an integer plus half a line.

FIG. 2 schematically shows, as a function of time, the picture signal 5 of a picture line, between two line sync signals 6 and 7. It is known that, in a 625-line television system, the duration of a line is 64 microseconds, the number of visible lines is of 575, and the number useful lines in a frame is 287.5.

In the system according to this invention, signal 5 is sampled through conventional means for providing a sequence of samples, one of which is shown as pulse 8.

The number of samples per line is determined in accordance with the desired picture resolution, which results in providing about 600–650 samples per line or 640 samples or 512 samples depending on either binary decimal addressing means or binary addressing means which are used for addressing those memories wherein the samples are stored. In the following description, the sampling means will not be described in details because they are well known in picture digitizing technics. By way of example, it will be assumed that there are 640 samples in a line either in a monochrome or a trichrome 625-line television system.

In the block-diagram shown in FIG. 3, there is provided a source monochrome television picture signals whose output is connected to input of sampling circuit 10. Source 9 may either be a television camera, or a video tape recorder, or still a signal received through a radio channel, and then demodulated. The output of circuit 10 is connected to an input of an analog-digital converter 11. The output of analog-digital converter 11 is connected, on the one hand, to the first input of a double-throw switch 13 and, on the other hand, to input of a memory 14 whose output is connected to the second input 15 of double-throw switch 13. Delay memory 14 delays signals applied to its input by the duration of a frame plus half-a-line duration. Thus, digital samples delivered, at a given time, from converter 11 and delay line 14 correspond to two adjacent lines in two different frames, but with a shift of half-a-line duration. Double-throw switch 13 comprises two two-way contacts 16 and 17 which are respectively connected to outputs 18 and 19 of the switch and are controlled at the same time by a signal LP whose frequency is twice the line frequency and synchronous with beginnings of line and half-a-line. Outputs 18 and 19 of double-throw switch 13 are respectively connected to inputs of parts 20a and 20b of a modulator 20 which has as many outputs as there are samples in a line, (i.e. 640 outputs.) Each output of modulator 20 is connected to an input of an electro-optic device 21 which is made of 640 identical electro-optic elements. Light beams generated by electro-optic elements of 21 are deflected by a rotating mirror 22 toward a photographic film 23, through a photographic lens, not shown.

FIG. 4 shows the light generating surface of the electro-optic device 21 which is made of elementary radiating surfaces 24. Beams radiated from surfaces 24 are reflected by mirror 22 which rotates for each line by an angle equal to 1/276th of the total effective angle that corresponds to the picture height. When mirror 22 makes complete revolutions, it rotates uniformly and comprises alternatively operative and unoperative facets. When mirror 22 operates in swinging, mirror oscillations are symmetrical. Film 23 is steady during the operative frame and moves during the unoperative frame.

Further to be noted, read operations from modulator 20 are controlled by a group of read clocks 25 that in turn are controlled by a signal T at the frame frequency.

FIG. 5 shows the diagram of modulator 20 associated with an electro-optic device 21. In device 21, electro-optic elements are electro-luminescent diodes, such as 26, each diode 26 being associated with the storage of a sample 8 of a line. It is assumed that diodes 26, despite their small sizes, cannot radiate adjacent light beams capable of overlapping each other enough to produce a line of luminous points without any gap. Therefore the light radiated by each diode at 27 is transmitted through an optic fiber 28. All the optic fibers 28 are grouped and aligned in a block 29 which is to open toward mirror 22 normal to element surface 24. In practice, fibers 28 group the diodes 26 into different identical modules 30a and 30b which are not necessarily either aligned or located close to each other. To avoid fiber breakings, the fibers may be embedded in a plastic material once junctions from modules 30a and 30b to block 29 have been made. At surface 24, circles of cut fiber 28 are obviously located side by side to embody continuous straight line segment(s).

One electrode of each diode 26 is ground while the other electrode is connected from the corresponding output of modulator 20. In the described embodiment, the light modulator 20 is made of identical modules 31a and 31b, each of which comprise eight shift registers 32. Modules 31a form the part 20a (FIG. 1) of modulator 20 and modules 31b forming the other part 20b. Each series output 33 of shift register 32 is connected to the control electrode of the corresponding diode 26. It will be noted that the number of diodes 26 in modules 30a and 30b is the same as the number of shift registers 32 in modules 31a and 31b, the number of eight shift registers per module being slected in either an arbitrary manner or for practical considerations.

Each module 31a or 31b comprises a distributor register 34. Shift registers 32 have parallel input and series output. Each shift register stores a word of 6 bits representing the amplitude of a sample 8 or a value derived from that amplitude. The selection of 6 bits per sample is obviously arbitrary. In a module, parallel inputs of the eight shift registers 32 are multipled to an input six-wire lead which sequentially transmits the eight words corresponding to the eight successive samples 8 of a line or half a line. The input leads of modules 31a are parellel connected from output 18 of switch 13 while the imput leads of modules 31b are parallel connected from output 19 of switch 13. Distributor register 34 receives a signal through wire 35 to make the associated module operative. Clock signals are received at the sampling frequency over wire 36 to address the registers 32. The successive words are received either through wire 18 or wire 19. Address control signals, for addressing registers 32, are transmitted through wires 37. Output 38 of distributor register 34 may be connected to input 35 of the next module if it is desired to serially address modules 31a and 31b, which is preferable, but not compulsory. Each shift register 32 comprises seven cells. The first six cells receive and store the six bits of a word which are written in parallel. The seventh cell 39 is one into which the six bits are sequentially shifted under the control of read pulses applied to shift register 32 through wire 40. In the sample word, the least significant bit is written into the cell adjacent to cell 39 while the highest significant bit is written into the cell farthest from cell 39.

Pulses transmitted via wire 40 may be, as shown in FIG. 5, applied in parallel to the registers 32 of a module 31a or even of several modules 31a, as it will be described in the following, which permits to modulate diodes 26 of the corresponding module 30a or modules 30a, within the same time interval. Thus, it is possible to modulate a portion of diodes 26 in a line within the same time interval.

Figure 6:
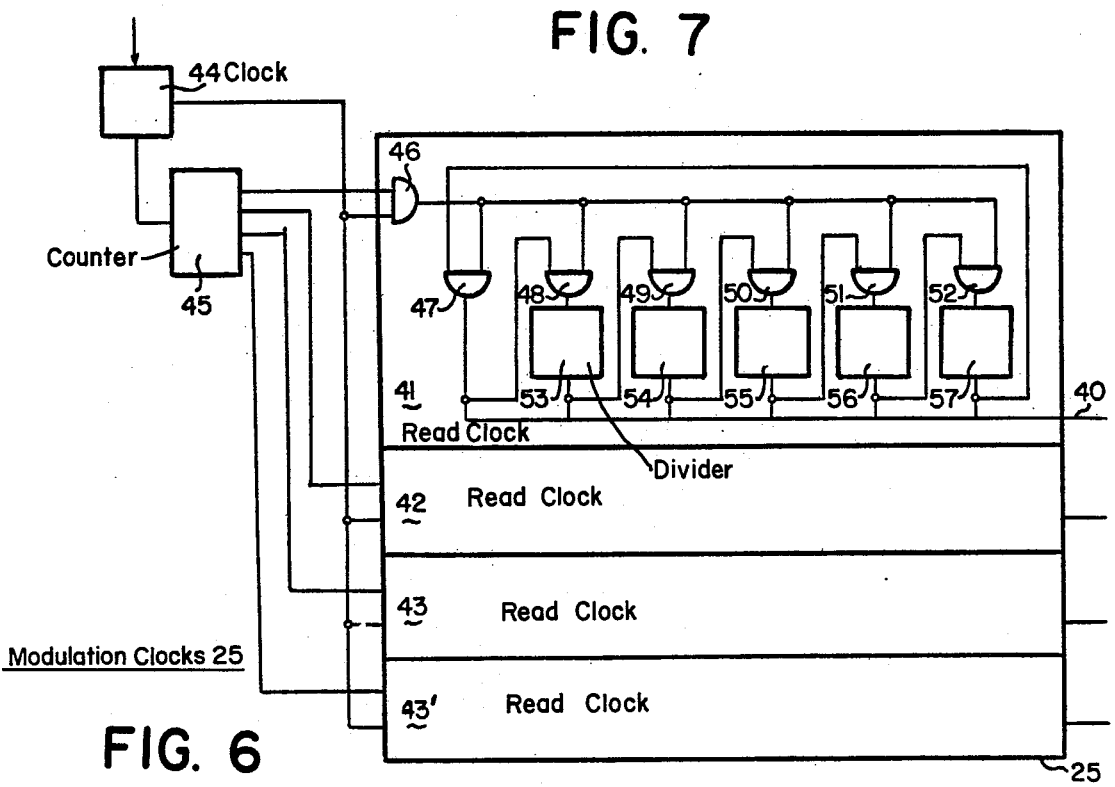
FIG. 6 shows the diagram of modulation clocks used with the modulator shown in FIG. 5.
Figure 8:
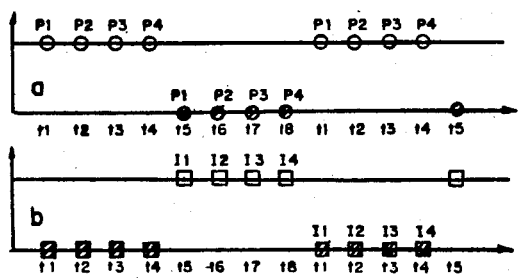
FIG. 8 and FIG. 9 are time diagrams illustrating the operation of the light modulator shown in FIG. 5.
Figure 9:
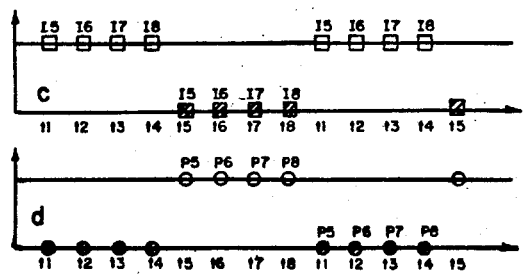

Pulses transmitted via wire 40 are delivered from a clock 41 belonging to the clock assembly 25, FIG. 3. The clock assembly 25 will be described in detail with reference to FIGS. 6 and 7. By way of example, the assembly 25 comprises four read clocks 41, 42, 43 and 43' supplied from a clock 44 and a divider circuit 45 having a plurality of outputs. Clock 44 is synchronized in a known manner with either line or frame sync signals, as indicated by signal T, and delivers recurrent pulses at a frequency of 2 MHz. Within a picture line duration clock 44, accordingly, delivers 128 pulses that are counted in circuit 45 which delivers to read clock 41 a clock signal from the first pulse to the 32nd pulse, to read clock 42 a clock signal after the 32nd pulse, to read clock 43 a clock signal after the 64th pulse, and to read clock 43' after the 96th pulse, other pulse distribution being possibly as indicated in the following.

Clock 41 comprises an AND gate 46 which transmits pulses from clock 44, when gate 41 is enabled by the corresponding output of 45. Signals delivered from AND gate 46 are parallel applied to the first inputs of AND gates 47-52. Outputs of AND gates 48-52 are respectively connected to inputs of dividers 53-57, whose division ratios are graded as powers 1-5 of 2. Outputs of dividers 53-57 are respectively connected to the second inputs of AND gates 49-52 and 47. The output of AND gate 47 is connected to the second input of AND gate 48. In addition pulses delivered from AND gate 47 and dividers 53-57 are parallel applied to read wire 40 of shift registers 32.

FIG. 7 shows one of the series of six pulses delivered to wire 40. Those pulses are respectively indicated by the numerical references of the circuits generating them. Time intervals between those successive pulses are respectively of 0.5 microsecond from the initial pulse 58 to pulse 47, 1 microsecond from 47 to 53, 2 microseconds from 53 to 54, 4 microseconds from 54 to 55, 8 microseconds from 55 to 56, and 16 microseconds from 56 to the final cycle pulse 57.

Thus, it appears that modulator 20 has the same behaviour as an amplitudeduration converter. Diodes 26 are lit at a constant level defined by the output level of cell 39. For the least significant bit, the asociated diode 26 is lit during 0.5 microsecond from 58 to 47. For next to the least significant bit, it is lit during 1 microsecond, and so on, up to the most significant bit for which it is lit during the 16 microseconds extending from 56 to 57. The point of film 23, FIG. 3, which is impinged by light from the associated diode 26 is intergrating the various constant level light durations so that the illumination value of the film point corresponds to the amplitude of the initial television picture signal luminance sample.

Obviously that selection of a process of lighting an electro-optic element at a constant level in modulating the lighting duration is possible because the electro-optic elements of a line may remain lit simultaneously during a time interval. As the points in a line become more numerous, the time interval may become longer. Then that lighting process affords a high accuracy with respect to the modulation quality.

On the other hand, it is known that electro-optic transducers or elements presently available on the market rarely have linear or even regular current-light or voltage-light transfer characteristics. Certain of those transducers are only capable of switching on or off. Thus the constant level lighting process does not take into account the nonlinearities of the transducers. It is well suited to the use of digital methods. Finally, by providing an adjusting means between cell 39 and the associated diode 26, the level of the voltage or current applied to diode 26 may individually adjusted to take into account the possible response differences among diodes 26.

It is still to be noted that modulator 20 is not a conventional amplitudeduration converter wherein the duration of the delivered constant level signal is continuous. Rather it is a relatively simple converter by which the light duration is divided into discontinuous segments, which have no importance since the material responsive to the integrates light the received energy.

With reference to FIGS. 8a, 8b, 9c and 9d, the operation of modulator 20 will now be described. Such an operation comprises the write step for writing the digital samples into modulation via switch 13 and the read step to diodes 26. To make the described embodiment more simple and comprehensive, although a picture line contains in principle 640 points, only eight points per line, i.e., four points per half a line, have been indicated in FIGS. 8 and 9. FIG. 8 illustrates the operation of modulation part 20a. FIG. 9 illustrates the operation of modulation part 20b. Empty circles indicate even-frame line samples at the time when they are written into part 20a. Hatched circles indicate even-frame line samples at the end of the read time thereof, i.e., at the time diodes 26 are definitively extinguished in a read cycle. Empty and hatched squares have respectively the same meanings with respect to odd-frame line samples.

During the period $t1$–$t4$, contacts 16 and 17 of switch 13 are in the condition illustrated by FIG. 3. During the period $t5$–$t8$, they are in the reverse condition. Simultaneously, as shown in FIGS. 8a and 9a, at times $t1$, $t2$, $t3$ and $t4$, the written data are respectively samples of points P1, P2, P3 and P4 of the first half of an even line and samples I5, I6, I7 and I8 of the second adjacent half of an odd line. It is assumed that as soon as a sample, either P1 or I5 for example, is written into modulation 20a or 20b, the point begins to be read with a successive transfer of each bit. Into cell 39 (FIG. 5). In other words, point P1 starts to light the associated diode 26 before point P2 starts to light its associated diode. At time $t5$ (i.e. a time interval equal to half a line duration ($\frac{1}{2}$H) after $t1$, or 32 microseconds later than $t1$), diode 26 associated with point P1 is extinguished. Now idle is the shift register 32, wherein the saple P1 was stored. Thus, another sample may be written into that idle shift register 32. This occurs because between $t4$ and $t5$ switch 13 has turned its condition and contacts 16 and 17 respectively connect input 15 to output 18 and input 12 to output 19. Therefore, at time $t5$, sample I1 of the next first half of an odd line is written in that shift register 32, which formerly stored P1. Still that register is immediately positioned on the read step and at the next time $t1$ the point I1 is extinguished. The shift register 32 is again idle and ready to store the next point P1. The above described operation is similar with respect to points I5–I8 and P5–P8 with reference to FIGS. 9a and 9b.

In short, the read time duration for modulator 20 is equal to half its write time duration. Two lines may be read during a picture line duration. Thus, at the end of a frame, the contents of two frames has been stored on film 23. During the duration of the next frame, a reading of the modulator is forbidden, for example, by suppressing the signal T at the input of clock 44. That dead time makes unoperative one area over two in mirror 22 when it rotates uniformly, or is utilized to back the mirror when it is oscillating.

Figure 10:
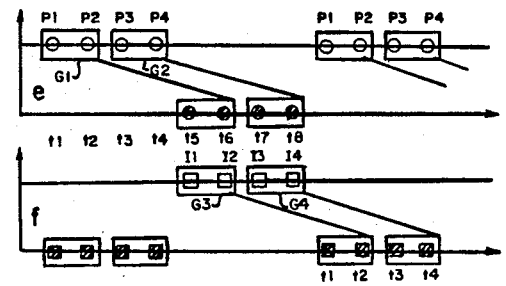
FIG. 10 is a time diagram illustrating an alternative in the operation of the light modulator shown in FIG. 5.

However that operation, as just described, implies a number of read clock, as 41, identical to the number of points in a line, which is not conceivable when there are 640 points in a line (and not 8 points as described for simplification purposes). The number of read clock points may be reduced by considering that each half a line may be separately read out. However this would not be enough. FIG. 10 explains how that number can be considerably reduced. FIG. 10e is similar to FIG. 8a while FIG. 10f is similar to FIG. 8b.

From FIG. 7 it is known that between read times 56 and 57, the most significant bit of a sample is being in cell 39. Responsive thereto immediately after read time 56, the associated shift register 32 may be supplied with the next sample without waiting for the read time 57. That characteristics is utilized in the following manner with reference to FIG. 10. Point P1 is written at time t1, but the start of its read step start is delayed up to time t2, while point P2 is written at time t2 and begins immediately to be read. In other words, points P1 and P2 are written in a chronological manner, but are read out at the same time, the read out of P1 being delayed. At time t5, the diode 26 associated with point P1 is still busy, but the most significant bit of P1 is stored in cell 39 so that point I1 may be written in the same shift register 32. At time t6, the cell 39 associated with point P1 becomes idle as well as that associated with point P2 and point I2 is normally written. Point I1 will start to be read out at the same time as point I2.

The delay from write to read for a point may be in the order of 16 microseconds to a maximum which leads to a utilize of only two clocks per half a line. However instead of using groups of quarters of line, such as G1, G2, G3 and G4, it is also possible to use more than two groups per half a line for practical addressing reasons. It is to be noted that the circuit shown in FIG. 5 comprises groups of eight points in each modules 31a or 31b. To form larger groups, it is sufficient to multiple wire 40 onto a certain number of groups.

Still to be noted, that mirror 22 may be eliminated if the camera carrying the film 23 operates contrary to conventional half-cycle standard cameras. The film 23 may be exposed when it moves, the film movement being controlled to be linear and synchronized with a frame during half of the time which is assigned to recording. The film is stopped during the other half time. Preferably the camera is shuttered when the film is stopped, for protecting the film (which is contrary to what occurs in standard cameras).

The recording of a trichrome picture will now be described with reference to the block-diagram shown in FIG. 11. Television picture signals are supplied from a source 59 to an adapter 60 whose outputs deliver the conventional Red-Green-Blue signals or RGB signals. The adapter 60 is well known to people skilled in the art and will not be described in detail. In order to digitize the primary signals RGB with the highest efficiency, a nonlinear correction (such a logarithmic correction that is common in digitizing techniques) is preferably applied to those primary signals. Therefore, channels R, G and B are applied to a corrector circuit 61 which delivers corrected primary signals which are then converted in conventional signals Y, C1 and C2 through a conventional matrix circuit 62. Signals of channels Y are comprised in a broad band of 6 MHz while signals of channels C1 and C2 are comprised in a narrower band of 2 MHz. Signals Y, C1 and C2 are digitized in an analog-digital converter or A/D converter 63, which comprises three A/D converters, one for each channel. The first converter is associated with channel Y and is much more rapid than the two others. Its sampling rate is in the order of about 12 MHz. Between matrix circuit 62 and A/D converter 63, there may be a second corrector circuit 64. Outputs of A/D converter 63 are respectively connected, on the one hand, to inputs of a dematrix circuit 65, and, on the other hand, to inputs of a delay circuit 66, which has the same function as the delay line 14 shown in FIG. 3. As a matter of fact, delay circuit 66 comprises a delay line 67, made for example of shift registers, a multiplexer 68 and a demultiplexer 69. Channel Y entering delay line 67 comprises six wires corresponding to the 6 bits of a word in that channel wherein the digital data rate is relatively high. Channel C1, as channel C2, entering multiplexer 68 comprises four wires corresponding to the four bits of a word which is long enough to digitize a chrominance channel wherein the digital data rate is lower. Therefore, due to the difference of data rates, channels C1 and C2 may be time multiplexed before passing through delay line 67 to which multiplexer 68 is connected. From the output of delay line 67 there are connected, on the one hand, the channel Y and, on the other hand, the demultiplexer 69 that delivers the signals of channels C1 and C2.

The outputs of delay circuit 66 are connected to inputs of a dematrix circuit 70, which is identical to dematrix circuit 65. According to the same principles of operation as those described with reference to FIG. 3, circuit 65 receives words from even frame lines (or odd frame lines) while circuit 70 receives words from odd frame lines (or even frame lines) delayed in delay circuit 66 by a frame duration plus half-a-line duration. Each circuit 65 or 70 respectively converts digital inputs signal Y, C1 and C2 back into digital output signals RGB and respectively applies them to circuits 71 and 72 which each makes a corection contrary to that made in corrector 61, with possible changes to take into account the sensitometry characteristics of film 77. The outputs of corrector circuits 71 and 72 constitute the two inputs, each involving three channels, of a switch 73 similar to switch 13 shown in FIG. 3, but comprising three double-throw contacts. The outputs of switch 73 are respectively connected to the two parts of a modulator 74 which is made of three parallel modulators and is similar or identical to modulator 20 shown in FIG. 3. The three modulators of 74 supply three series of diodes which are similar to diode 26, which constitute the light generators in the electro-optic device 75. A mirror 76 is also provided, as well as a photographic film 77, to record the trichrome pictures.

Figure 12:
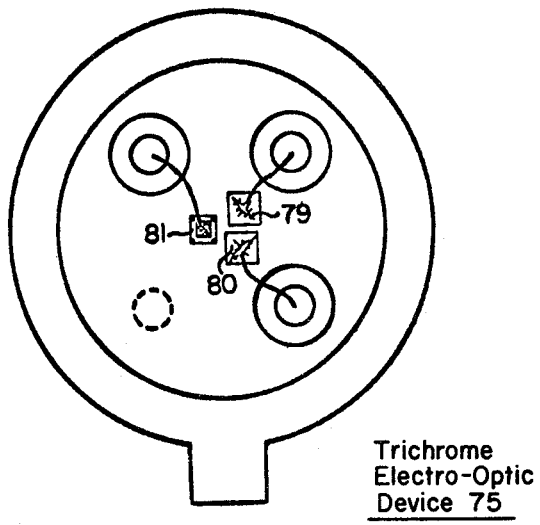
FIG. 12 is a schematic view of a trichrome point utilized in the electro-optic device of the system shown in FIG. 11.

FIG. 12 shows one part of electro-optic device 75 comprising sets of three diodes. Each diode radiates a primary color which is different from the two other diodes. The lights from the three diodes may be combined to form a single colored point at the recorded face of device 75. Preferably, diodes 79, 80 and 81, have a common grounded electrode, and should respectively radiate the colors red, green and blue. They must switch fast enough to deliver light at a constant level during as short a time period as 0.5 microsecond. The device is black before and after. However presently there is not such a fast blue radiating diode available. Therefore in a preferred embodiment according to this invention, the triplet Red-Green-Blue is changed into the triplet Green-Red-Infrared associated with a photographic film, wherein the layer responsive to the green contains a coupler which turns yellow and serves as a filter for blue radiations. The layer which is responsive to red contains a coupler for turning magenta which is a filter that stops green. The layer responsive to infrared contains a coupler for turning cyan which is a filter that stops red. Thus the film is impinged by the triplet Infrared-Red-Green, but restored for reproducing the common triplet Red-Green-Blue, the pellicle making the necessary spectral conversion. Such films are available on the market and, by way of example, may be aerochrome infrared films 2443 and 3443 which are commercialized by the KODAK company.

The best fitted materials may be selected for the diodes as for example Ga AsP radiating at 660 nm for the red, GaP radiating at 565 nm for the green, and Ga As radiating at 900 nm or 880 nm, or still Ga AlAs radiating at 800 nm or 850 nm for the infrared.

Figure 13:
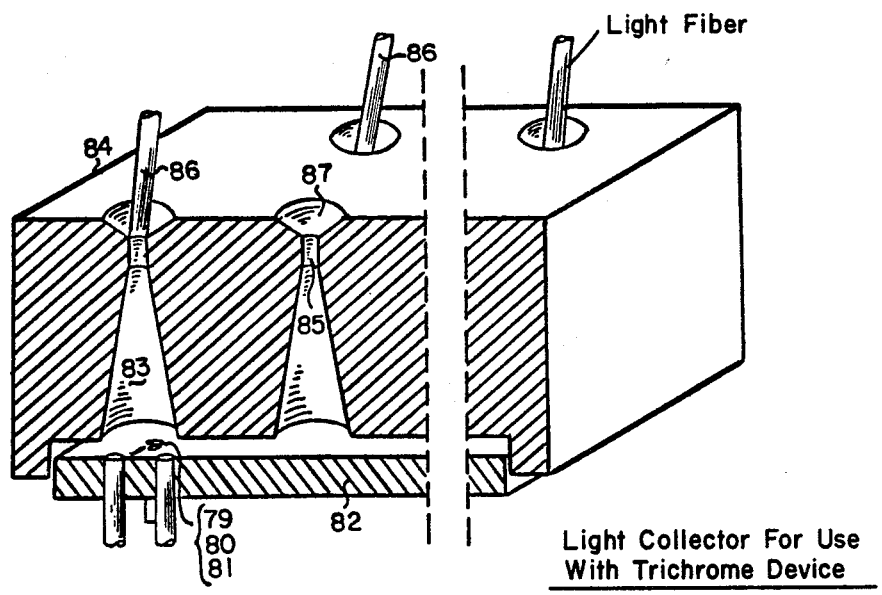
FIG. 13 is a schematic perspective view of a light collector used with the trichrome point shown in FIG. 12.

Each set of three diodes 79, 80, 81 may be arranged in a circle having a diameter of 1.5 mm. The sets may be arranged on strips with a pitch of 1.8 mm which, however, results in providing a total length of 1.20 m for 640 points in a line. That is prohibitive in the desired application. Therefore each set of three diodes is arranged on a dice 82, FIG. 13, and is associated with a hollow cone 83 formed in an opaque block 84. The dice 82 and the block 84 comprises a number of diode-cone couplets. Each hollow cone 83 has a good reflective surface in order to concentrate the light radiated from the larger cone base on which the diodes are arranged to the outlet 85 of the smaller cone base. The end of an optical fiber 86, operating as fibers 28 shown in FIG. 5, is arranged in outlet 85. At its upper side, block 84 is also provided with conical holes 87 in front outlet of 85 to make it easier to mount the fibers 86. As a matter of fact, each cone 83 has two functions. First, it concentrates the radiated lights into a narrower cross-section beam to produce, with the aid of fibers 86, a line 24 which is to be filmed and having acceptable reduced sizes. Second, it mixes colored lights from diodes. It is also to be noted that between modulators 20 or 74 and the diodes buffer amplifiers may be provided for supplying the diodes with the needed power.

Figure 11:
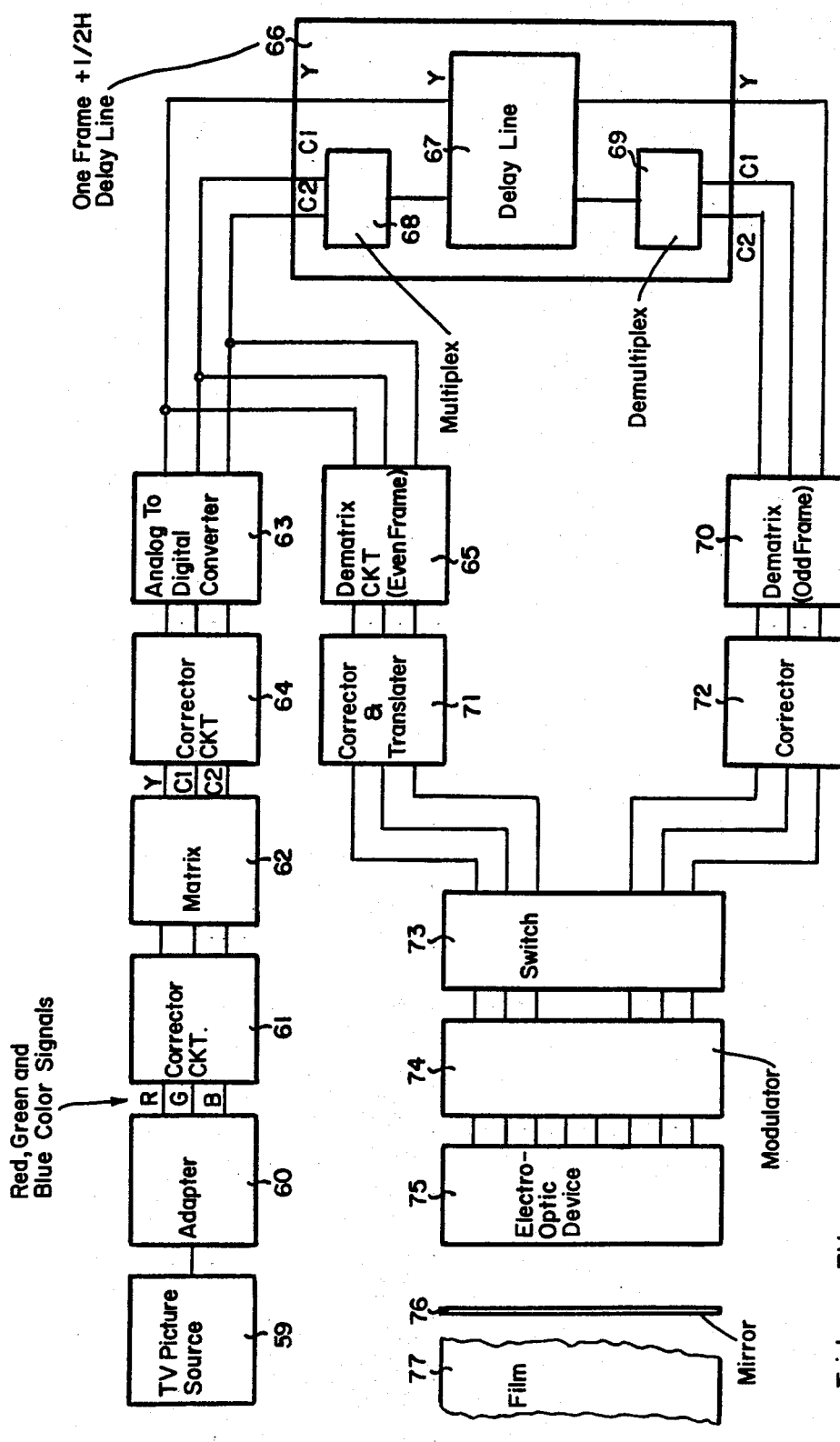
FIG. 11 is a block-diagram of a trichrome television picture photographic film recording system, according to this invention.

FIG. 14 shows in detail the dematrix circuit 65 or 70, FIG. 11, utilized for obtaining a primary color, for example, from signals Y, C1, C2. Indeed the circuit shown in FIG. 14 produces the signal R, red, in accordance with the equation: $R = Y + \alpha C1 + \beta C2$, wherein factors $\alpha$ and $\beta$ are selected depending on the system of utilized primary colors. Signal C1 is applied to a digital multiplier 88 which multiplies it by the digital factor $\alpha$. In parallel signal C2 is applied to a digital multiplier 89 which multiplies it by the digital factor $\beta$. Outputs of multipliers 88 and 89 are added in the digital adder 90. Output of adder 90 and signal Y are added in the digital adder 91 whose output delivers signal R. Two other similar circuits wherein the values of digital factors $\alpha$ and $\beta$ only vary deliver signals V and B respectively.

It is to be noted that corrector circuit 64 may have the same type of structure, but it uses analog circuits in order to produce a change in the colorimetric references that make further processing easier. Circuit 71 makes it possible to provide a correction according to which an output value corresponds to an input value according to a predetermined law; therefore circuit 71 operates as a digital translator well known in digital techniques.

In an alternative embodiment according to this invention, delay line 14 with switch 13, shown in FIG. 3, or delay circuit 66, together with circuits 70, 72 and switch 73, shown in FIG. 11, may be suppressed by using for the photographic recording a rapid pull down pneumatic camera, such as for example a 16 mm kinescope recording camera DBM64 commercialized by DBM. This camera is with an oscillating mirror 22 or 76 moving as a sawtooth with rapid back movement synchronous with television picture scanning.

While the principles of the present invention have hereabove been described in relation with particular embodiments, it must be clearly understood that the said description has only been made by way of example and does not limit the scope of this invention.

What is claimed is:

1. A system for recording television pictures on film, said system comprising means for sampling the television video signal at a sampling rate which is determined by the photographic film resolution, every sample including digital luminance and digital chrominance data corresponding to a point in the television picture, digital means for storing said digital luminance and chrominance data in a digital form, means for reading every sample from the digital store in the form of a digital signal, means responsive to said reading means for selectively applying said signals to a set of electrodes of a steady electro-optic device, the said set of electrodes producing an image on a surface of said electro-optic device, and means including a photographic film camera for recording said image in either monochrome or polychrome, the image produced by said set of electrodes being a light point having a luminous intensity and color, which varies as a function of the sample contents.

2. The television picture recording system, according to claim 1, and means whereby the image on the filmed electro-optic device surface corresponds to a picture line or a picture line portion, and means for applying samples representing the line or line portion simultaneously to the set of electro-optic device electrodes, and vertical scanning means enabling the camera to sequentially film each of the picture lines.

3. The television picture recording system, according to claim 2, wherein said vertical scanning means includes a mirror, means for rotating said mirror at a rate which is coordinated with the vertical scanning frequency, said mirror reflecting said image toward the camera.

4. The television picture recording system, according to claim 2, wherein said vertical scanning means includes a mirror, means for swinging said mirror about a horizontal axis, the swing frequency being coordinated with the vertical scanning frequency and in the form of a symmetric saw-tooth.

5. The television picture recording system, according to claim 2, wherein said vertical scanning means comprise means for moving said photographic film vertically within the camera.

6. The television picture recording system, according to claim 1, and television picture scanning means comprising means for scanning two interlaced frames, signal delay means, means for directly applying the samples belonging to one of the two interlaced frames from the digital store means to the set of electro-optic device electrodes while the samples belonging to the other interlaced frame are being delayed in said delay means by a time interval equal to a frame period plus a half-line period, means for thereafter applying said delayed signals to the said set of electro-optic device electrodes, the filmed electro-optic device surface being operative during a time period which is equal or shorter than a half-line period to provide a full picture wherein interlacement is suppressed.

7. The television picture recording system, according to claim 6, and means for operating the electro-optic device only during every second frame for displaying a full picture during one frame and nothing during the next frame, so as to provide a conventional cinema recording cycle.

8. The television picture recording system, according to claim 7, wherein said vertical scanning means comprises a conventional cinema camera film moving means which have been modified to include means for moving the film during the interval for recording a picture and for stopping the film during the interval between picture recording, whereby the film movement operation is reversed to that of a conventional cinema camera, and means for opering the cinema camera shutter while the film moves, but closing it when the film is stopped.

9. The television picture recording system, according to claim 1, and an electro-optic display system means associated with said electro-optic device, said system display means comprising binary modulation means for modulating electro-optic transducer means for diplaying digital signals, said modulation forming successive digital words, each corresponding to a display screen point, each of said digital words having different weights indicated by a modulation period generated by each bit, the said binary modulation means comprising a shift register for each point in a series of points in the TV picture which is to be simultaneously displayed, each shift register comprising as many cells as there are bits in any one of said digital words, plus an added output cell, means for reading out the digital words by shifting said registers under control of a clock for delivering pulses separated by time intervals which vary depending on the weight of the bit to be shifted into said output cell, and means for applying output signals from said output cell for operating the electro-optic device, said last named means including transducer means for displaying a point of light associated with the involved digital word.

10. The television picture recording system, according to claim 9, wherein the electro-optic device comprising, in the case of monochrome picture recording, three sets of two electrode component means made from an electro-optic material, each of said component means being controlled responsive to signals applied to the two electrodes of that component, one electrode being grounded and the other electrode being connected to the corresponding sample memory output, each of said points of light having associated therewith three of said component means, each belonging to a different set and each radiating one out of the three primary colors, the three component means associated with a point being close enough to each other to radiate in substantially the same direction, and optical means for mixing the primary lights radiated from the component means and guiding the mixed light to be filmed.

11. The television picture recording system, according to claim 10, wherein each of said component means is an electroluminescent diode and the optical means comprises a light collector and an optical guide, the light collector being a hollow section of a frusto-conical surface, the electroluminescent diode being arranged in the center of the base of said frusto-conical surface in the case of monochrome recording or three electroluminescent diodes being arranged close to the center of the base of said frusto-conical surface, in the case of polychrome recording, and means for connecting an optical transmission line into an input cross section of an optical guide in the top of said frusto-conical section.

12. A television picture photographic film recording system, according to claim 11, wherein the optical transmission line is an optical fiber.

* * * * *

UNITED STATES PATENT AND TRADEMARK OFFICE
CERTIFICATE OF CORRECTION

PATENT NO. : 4,112,459
DATED : September 5, 1978
INVENTOR(S) : Gautier et al

It is certified that error appears in the above-identified patent and that said Letters Patent are hereby corrected as shown below:

Col. 8, Line 19, "modulation" s/b --modulator--

Col. 8, Line 20, "modulation" s/b --modulator--

Col. 8, Line 35, "modulation" s/b --modulator--

Col. 8, Line 37, insert --shift register-- between "into" and "cell"

Col. 8, Line 43, "saple" s/b --sample--

Col. 9, Line 37, delete comma and insert --is--

Col. 10, Line 19, insert --the-- between "which" and "multiplexer

Col. 10, Line 59, insert --the color is displayed-- before the period

Col. 11, Line 29, "outlet of" s/b --of outlet--

Col. 11, Line 40, insert --such as red-- between comma and "for"

Col. 12, Line 2, insert --associated-- between "is" and "with"

Signed and Sealed this

Twenty-ninth Day of May 1979

[SEAL]

Attest:

RUTH C. MASON
Attesting Officer

DONALD W. BANNER
Commissioner of Patents and Trademarks